US011309966B2

(12) United States Patent
Weeber et al.

(10) Patent No.: US 11,309,966 B2
(45) Date of Patent: *Apr. 19, 2022

(54) LATENCY CONTROL IN A PASSIVE OPTICAL NETWORK

(71) Applicant: ALCATEL-LUCENT USA INC., Murray Hill, NJ (US)

(72) Inventors: William B. Weeber, Raleigh, NC (US); Timothy J. Williams, Raleigh, NC (US)

(73) Assignee: NOKIA OF AMERICA CORPORATION, Murray Hill, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/983,943

(22) Filed: Aug. 3, 2020

(65) Prior Publication Data

US 2021/0075512 A1  Mar. 11, 2021

Related U.S. Application Data

(63) Continuation of application No. 15/817,831, filed on Nov. 20, 2017, now Pat. No. 10,735,098.

(Continued)

(51) Int. Cl.
H04B 10/27 (2013.01)
H04J 14/02 (2006.01)
H04B 10/2507 (2013.01)

(52) U.S. Cl.
CPC ......... H04B 10/27 (2013.01); H04B 10/2507 (2013.01); H04J 14/0227 (2013.01)

(58) Field of Classification Search
CPC combination set(s) only.
See application file for complete search history.

(56) References Cited

U.S. PATENT DOCUMENTS

2008/0166127 A1* 7/2008 Kazawa ............ H04J 14/0282
398/79
2014/0186039 A1* 7/2014 Luo ................. H04L 12/287
398/66

(Continued)

OTHER PUBLICATIONS

Jun Li, "Adaptive Registration in TWDM-PON with ONU Migrations", Nov. 11, 2014, vol. 6, No. 11 /Nov. 2014/J. Opt. Commun. Netw, pp. 943-945.*

(Continued)

Primary Examiner — Omar S Ismail
(74) Attorney, Agent, or Firm — Loza & Loza, LLP; Jessica Smith

(57) ABSTRACT

A method and apparatus for latency control in an optical network. A management node such as an OLT in a PON sends a discovery message intending to prompt joining network nodes such as ONUs to send a response on a first wavelength during a quiet window established for this purpose. When a response is received, a secondary upstream-transmission wavelength is assigned to the ONU. When the ONU sends data upstream according to a schedule calculated by the ONT, which schedule may include transmission times using the assigned secondary wavelength. In this case, the assigned secondary wavelength will be scheduled using a relatively smaller or no quiet window. This scheduling may be determined in part by the service or services used by the ONU.

20 Claims, 3 Drawing Sheets

Related U.S. Application Data

(60) Provisional application No. 62/424,827, filed on Nov. 21, 2016.

(56) References Cited

U.S. PATENT DOCUMENTS

| | | | |
|---|---|---|---|
| 2014/0219651 A1* | 8/2014 | Ruffini | H04B 10/272 398/33 |
| 2014/0294385 A1* | 10/2014 | Khotimsky | H04Q 11/0067 398/58 |
| 2015/0171965 A1* | 6/2015 | Ohteru | H04Q 11/0067 398/58 |
| 2015/0381300 A1* | 12/2015 | Roberts | H04B 10/07955 398/68 |
| 2016/0073180 A1* | 3/2016 | Khotimsky | H04L 43/0864 398/25 |
| 2016/0105253 A1* | 4/2016 | Liu | H04Q 11/0067 398/67 |
| 2016/0285555 A1* | 9/2016 | Wu | H04Q 11/0067 |
| 2018/0183525 A1* | 6/2018 | Capriata | H04J 14/0282 |
| 2019/0123846 A1* | 4/2019 | Cress | H04B 10/272 |

OTHER PUBLICATIONS

Li, "Adaptive Registration in TWDM-PON with ONU migrations." J. Optical Communications and Networking, vol. 6, Issue 11, pp. 943-951 (2014).

* cited by examiner

LATENCY CONTROL IN A PASSIVE OPTICAL NETWORK

CROSS-REFERENCE TO RELATED APPLICATIONS

The present application claims priority under 35 U.S.C. § 120 as a continuation application to U.S. patent application Ser. No. 15/817,831, entitled LATENCY CONTROL IN A PASSIVE OPTICAL NETWORK filed on Nov. 20, 2017, and issuing as U.S. patent Ser. No. 10/735,098 on Aug. 4, 2020, which claims priority under 35 U.S.C. § 119 to U.S. Provisional Patent Application Ser. No. 62/424,827, entitled LATENCY CONTROL IN A PASSIVE OPTICAL NETWORK filed on Nov. 21, 2016, both of which are incorporated by reference herein.

BACKGROUND

Field of the Disclosure

The present disclosure relates generally to optical network communication and, more particularly, to a manner of mitigating the effects of latency or jitter to facilitate operation of services sensitive to those effects.

Description of the Related Art

The following abbreviations are herewith expanded, at least some of which are referred to within the following description.
CPRI Common Public Radio Interface
IEEE Institute of Electrical and Electronics Engineers
ITU International Telecommunication Union
CPE Customer Premises Device
ISAM Intelligent Services Access Manager
OLT Optical Line Termination
ONT Optical Network Terminal
ONU Optical Network Unit
PON Passive Optical Network
TWDM Time and Wavelength Division Multiplexing An optical network, for example, a PON (passive optical network) may be used as an access network, connecting individual subscribers or groups of subscribers to a core telecommunications network. A typical PON includes, among other components, an OLT (optical line terminal) in a CO (central office) and a number of ONTs (optical network terminals) or ONUs (Optical Network Units) at subscriber premises (or some intermediate location). Many residential houses, for example, have an ONT that communicates with an OLT over a FTTH (fiber to the home) PON access network. The network may make available to the subscriber services such as Internet access, telephone, and television. Other optical networks may be similarly configured such that a management node such as an OLT may communicate with multiple end devices, for example in a data center. Note that in any case, endpoint terminals such as ONTs or ONUs may be added to or removed from the network during PON operation.

In a typical PON, the OLT or another exercises management functions including, for example, discovering new end devices that have been added to the network and scheduling upstream transmissions. The OLT may also assign wavelengths for use by various ONTs or for various services. When scheduling upstream transmissions, quiet windows are imposed. These quiet windows are enforced so that, for example, the OLT can monitor upstream transmissions for new devices that have been added to the PON.

The quiet windows may inflict inefficiencies on certain services. In order to honor the quiet window, end devices much buffer upstream transmissions to avoid jitter. This creates latency however, which is detrimental to certain services such as CPRI. A solution that avoids this latency would therefore be desirable.

Note that the techniques or schemes described herein as existing or possible are presented as background for the present invention, but no admission is made thereby that these techniques and schemes were heretofore commercialized or known to others besides the inventors. These needs and other needs are discussed further and addressed by the description.

SUMMARY OF EMBODIMENTS

The following presents a summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one aspect, a method of mitigating latency in an optical access network includes receiving during a quiet window a discovery response from a network node sent on a first upstream-transmission wavelength, assigning a secondary wavelength to the network node, wherein the assigned secondary wavelength is different than the first upstream-transmission wavelength, scheduling upstream transmissions such that the quiet window for secondary wavelength transmissions, if any, is smaller than for first upstream wavelength transmissions.

In some embodiments, the method also includes determining whether to schedule upstream transmissions from the network node using the assigned secondary wavelength. In these embodiments, the service type or network traffic conditions. The scheduling of upstream transmissions may from the network node may include scheduling all upstream transmissions from the network node using the assigned secondary wavelength.

The optical access network may, for example, be a PON and the network node an ONU. In this case, the scheduling may be done in an OLT.

In another aspect, apparatus for mitigating latency in an optical network includes a processor and a memory, and the apparatus is configured by program instructions stored in the memory that when executed by the processor cause the apparatus to receive a discovery response from a network node sent on a first upstream-transmission wavelength, assign a secondary wavelength to the network node, wherein the assigned secondary wavelength is different than the first upstream-transmission wavelength, and calculate a schedule for upstream transmissions such that the quiet window for secondary wavelength transmissions, if any, is smaller than for first upstream wavelength transmissions.

In some embodiments, the apparatus is further configured to determine whether to schedule upstream transmissions from the network node using the assigned secondary wavelength. It may also be configured to determine the service or services to be used by the network node and use this as a factor to schedule upstream transmissions from the network node using the assigned secondary wavelength. In some embodiments, network traffic conditions may be used as well. The apparatus may be, for example, an OLT in a PON.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Latency mitigation is very helpful for the provision of certain services over a PON (passive optical network), for example CPRI. Measures described herein are useful for latency mitigation in many implementations. An exemplary PON will now be described, although the solutions described herein are not limited to this particular configuration.

Figure 1:
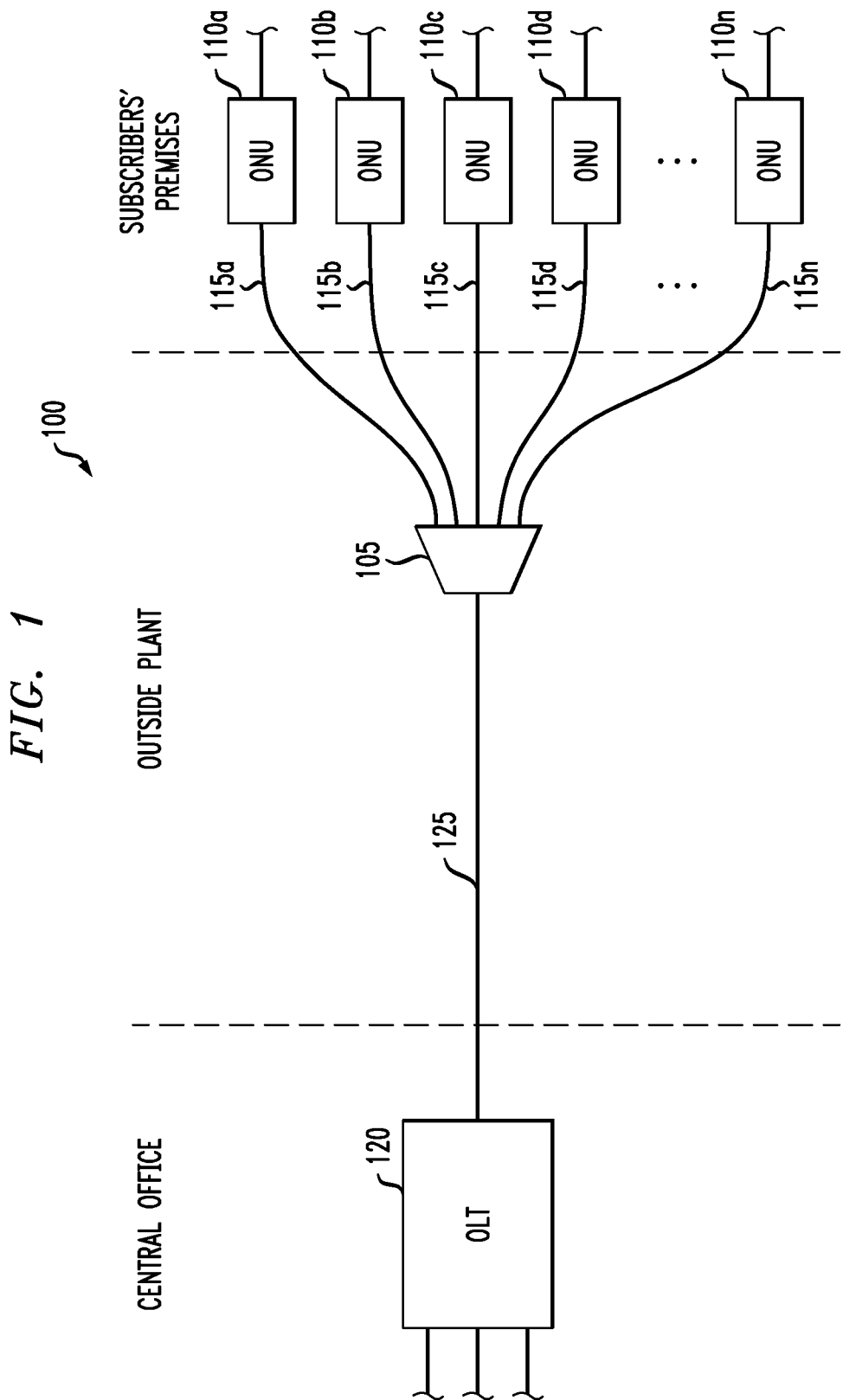
FIG. 1 is a schematic diagram illustrating selected components of an exemplary PON in which some embodiments may be advantageously implemented.

FIG. 1 is a simplified schematic diagram illustrating selected components of a typical PON 100 in which embodiments of the present invention may be implemented. Note that PON 100 may, and in many implementations will, include additional components, and the configuration shown in FIG. 1 is intended to be exemplary rather than limiting. Five ONUs, 110a through 110n, are shown, although in a typical PON there may be many more or, in some cases, fewer. In this illustration, each of the ONUs are presumed to be located at and serving a different subscriber, perhaps at their respective residences or other premises. The ONU at each location is connected or connectable to a device of the subscriber, or to a network of such devices (not shown).

PON 100 also includes an OLT 120, which communicates directly or indirectly with various sources of content and network-accessible services (not shown) that are or may be made available to the subscribers associated with PON 100. As should be apparent, OLT 120 handles the communications between these other entities and the ONUs. OLT 120 may also be involved in regulating the PON and individual ONUs. As mentioned above, the OLT 120 is typically located at a service provider location referred to as a central office. The central office may house multiple OLTs (not separately shown), each managing their own respective PON.

OLT 120 is in at least optical communication with each of the ONUs in the PON 100. In the embodiment of FIG. 1, OLT is connected with the ONUs 110a through 110n via a (feeder) fiber optic cable 125 and (access) fiber optic cables 115a through 115n. In this PON, a single splitter 105 is used to distribute a downstream transmission so that each ONU receives the same downstream signal. In this case, each ONU extracts and uses only its own portion of the downstream transmission.

In other optical networks, the splitter may also separate the signal into different wavelengths, if used, associated with each or various of the respective ONUs. The splitter in a PON is typically a passive element requiring no power. The splitter may be located, for example, in a street-side cabinet near the subscribers it serves (FIG. 1 is not necessarily to scale). This cabinet or similar structure may be referred to as the outside plant. Note, however, that no particular network configuration is a requirement of the present invention unless explicitly stated or apparent from the context.

In the example of FIG. 1, the splitter 105 may also serve as a combiner for combining upstream traffic from the ONUs 110a through 110n to the OLT 120. Upstream transmissions are generally at a different wavelength than those of downstream transmissions to avoid interference. In addition, each ONU may be assigned a separate time slot, that is, a schedule for making upstream transmissions. This means that ONU upstream transmissions are often bursty in nature as the data is buffered for transmitting when the assigned time slot opens.

The number n of ONUs in any particular implementation is not necessarily static, but can vary over time. This may be due to equipment failures but is often attributable simply to subscriber devices being brought into and out of service. An ONU leaving a PON ceases making any upstream transmissions or responding to OLT messaging and may then be removed from any transmission schedules (even if still physically connected to the network).

An ONU joining a PON will be discovered when standard protocols for this purpose are executed. For example, a newly connected ONU may monitor downstream transmissions from the OLT, then transmit its connectivity at a permitted time. Quiet windows are included in PON upstream transmission schedules for the purpose of allowing discovery. Once the ONU and OLT are aware if each other, identification and authorization protocols may be executed. Presuming that the new ONU is authorized, it becomes a regular part of the PON transmission schedule.

Unfortunately, however, enforcing these quiet windows for discovery means that relatively more upstream transmissions will have to be buffered and greater latency may result. For some services, this may not pose a great inconvenience, but for others, for example CPRI, it is often not acceptable. Described here is a configuration for addressing this issue.

Figure 2:
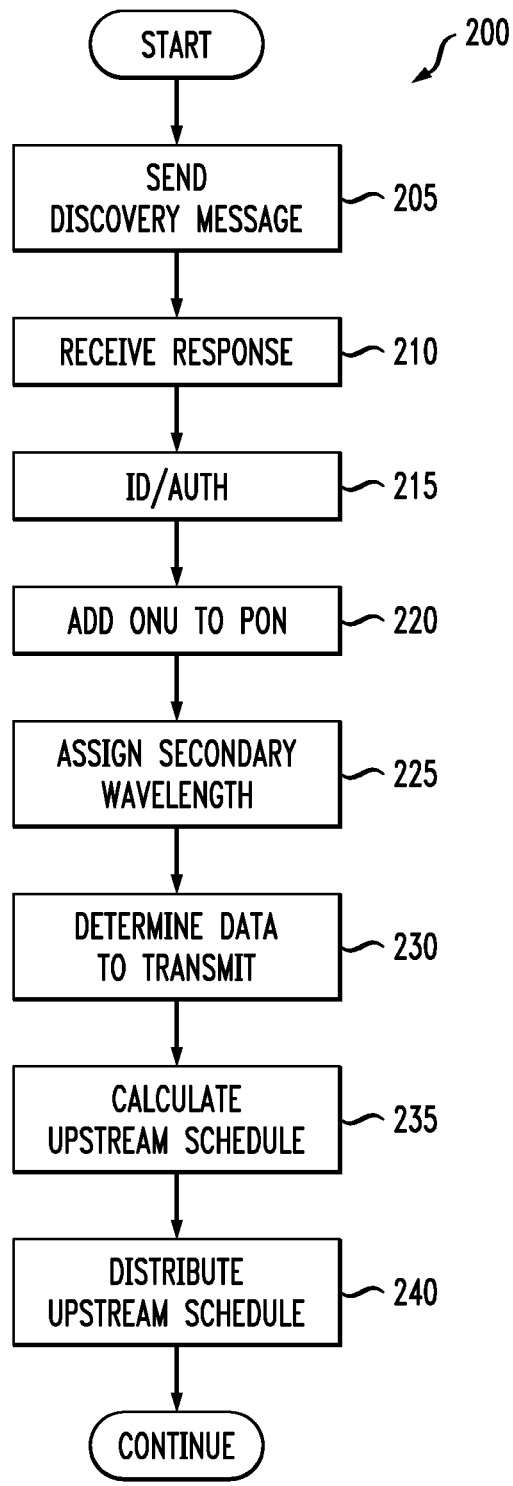
FIG. 2 is flow diagram illustrating a method according some embodiments.

FIG. 2 is a flow diagram illustrating a method 200 according one embodiment. At START it is presumed that the components necessary to perform the method are available and operational, at least according to this embodiment. In some implementations, this configuration includes both physical hardware and software program instructions that are executed in the performance of a particular operation or operations.

In the embodiment of FIG. 2, an OLT sends (step 205) a discovery message including the identity of at least one discovery time slot and a first upstream-transmission wavelength. As mentioned above, one or more ONUs may be physically connected to the PON without participating in PON transmissions. This may involve, for example, an outage of a previous participant or the addition of a new device. When a response from a non-discovered (that is, non-participating) ONU is received (step 210), the ONU is identified and authenticated (step 215). Note that this identification and authentication process will vary, and in some implementations, may be omitted entirely. Where it occurs, a determination (not separately shown) is made as to whether to add the ONU to the PON.

In the embodiment of FIG. 2, it is presumed that the ONUs identity has been confirmed and the device properly authenticated. The ONU is then added to the PON (step 220) as a participating member, including being added to the upstream transmission schedule. In accordance with this embodiment, a secondary wavelength different from the first wavelength is then assigned (step 225) to the ONU. The secondary wavelength is one on which the ONU may send upstream transmissions, preferably without interfering with upstream transmissions sent using the first wavelength.

In the embodiment of FIG. 2, a determination (step 230) is then made as to which participating ONUs have data to send. This may also include the quantity of upstream data to be sent. In accordance with this embodiment, it may also include a service type. The service type is an indication of what type of data is to be transmitted and, more importantly, how sensitive the data is to latency effects. As mentioned above, some services are more sensitive than others.

In the embodiment of FIG. 2, an upstream transmission schedule is then calculated (step 235), preferably taking into account some or all of the characteristics of the data for transmission that were identified in step 230. The upstream transmission schedule will include not only a time slot for individual ONUs to transmit upstream data but a wavelength to use as well. Some of the transmission may be scheduled to send on a secondary wavelength. In accordance with this embodiment, a secondary wavelength is scheduled without quiet windows, or in some cases with reduced quiet windows relative to the first wavelength. The schedule is then distributed (step 240) to the participating ONUs.

Note that in most implementations, the process of FIG. 2 is repeated periodically to adjust for changing conditions, including the addition or removal of ONUs from the PON. Note also that the sequence of message flow illustrated in FIG. 2 represents an exemplary embodiment; some variation is possible without departing from the spirit of the invention. For example, the operations shown in FIG. 2 may be performed in any logically-consistent order unless a definite sequence is recited in a particular embodiment. In some embodiments, there may be additional operations in the process and in others one or more of the illustrated operations may be omitted. In some executions of the process, some of the operations may be performed more frequently than others.

In the embodiment described above, there is a single first wavelength used for discovery, and perhaps other upstream transmissions. The first wavelength is scheduled using a quiet window to allow new ONUs time to transmit. In other embodiments, more than one wavelength may be used in this fashion. By the same token, there may be in some embodiments multiple secondary wavelengths. If so, they may each be scheduled using no quiet window or using quiet windows of varying duration.

In some embodiments, a secondary wavelength is assigned to a given ONU but is not used for scheduling upstream transmissions from that ONU, or not used all of the time. While in some embodiments a secondary wavelength is assigned to an ONU and used for scheduling upstream transmissions when the ONU has been added to the network, in other embodiments it may be assigned or used at a later time, if at all. The use of an assigned secondary wavelength by a particular ONU may depend on the service being used by it, for example, or the amount of data it has to send or has historically sent. It may also be a function of the amount of traffic in the PON as a whole, or on the volatility of the PON (how many ONUs are entering or leaving the network). Secondary channel schedule may also be assigned based on subscription. Other factors may be taken into account as well.

Figure 3:
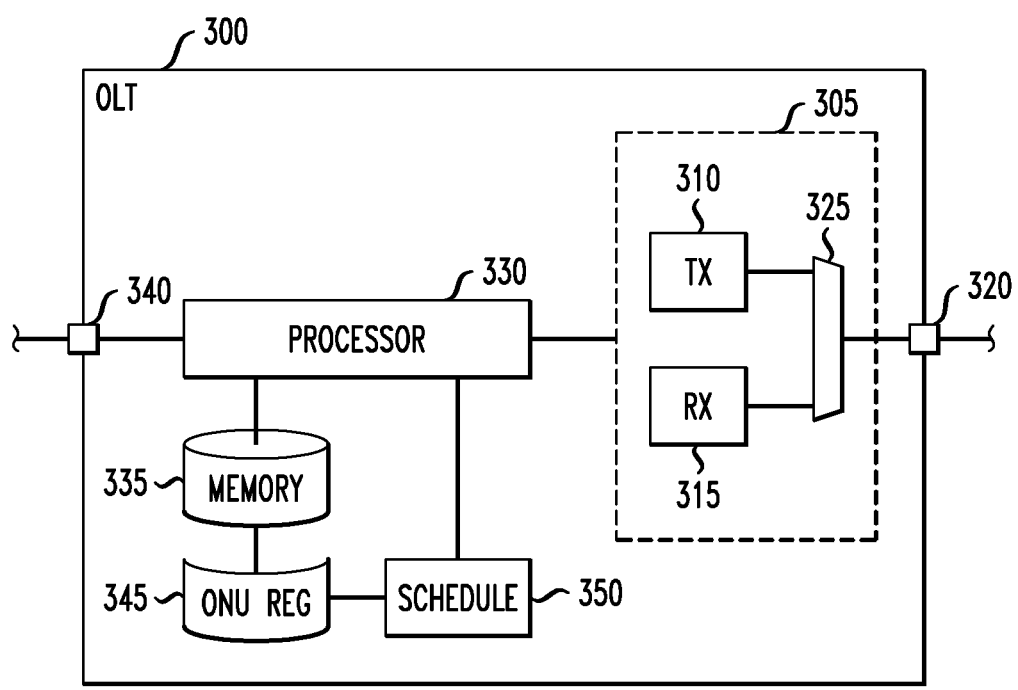
FIG. 3 is a schematic diagram illustrating selected components of an exemplary OLT according to some embodiments.

FIG. 3 is a simplified block diagram illustrating selected components of an OLT 300 according to an embodiment of the present invention. In the embodiment of FIG. 3, OLT 300 includes an optical module 305, which in turns includes an optical transmitter 310 and an optical receiver 315. The transmitter includes a light source (not separately shown) such as a laser, and the receiver includes a light detector such as a photodiode (also not separately shown).

In the embodiment of FIG. 3, an optical port 320 may be used to connect the OLT 300 to, for example, a feeder fiber in an optical access network such as a PON. In accordance with the present invention, an optical path formed at port 320 may place the OLT in communication a splitter/combiner such as splitter 105 depicted in FIG. 1. In the embodiment of FIG. 3, optical transmissions sent or received at the OLT 300 may be distributed to or from optical port 320 by an optical splitter/combiner (or simply "splitter") 325, which in this embodiment forms a component of optical module 305.

In the embodiment of FIG. 3, operation of optical module 305 is controlled by a processor 330, which may also control other elements of the OLT 300. Processor 330 may be implemented, for example, in hardware or in hardware executing program instructions stored on memory 335. Similarly, unless explicitly stated otherwise memory 335 is storage medium implemented in hardware or in hardware executing program instructions and is non-transitory in the sense of not being merely a propagating signal. Memory 335 may also be used to store data and program instructions for the operation of other components. In other embodiments, more than one processor or memory device may be used to perform the functions described herein.

In the embodiment of FIG. 3, processor 330 is also in communication with central-network port 340, though which OLT 300 communicates (directly or indirectly) with one or more networks, for example the Internet or a content provider. Note that central-network port 340 is merely representative to place this embodiment in a typical operating environment and other configurations are possible.

Shown separately in FIG. 3 is an ONU register 345 for tracking those ONU that have become part of the PON, assigned upstream-transmission wavelengths and, in some embodiments, other information or usage statistics related to the ONUs. A scheduler 350 calculates upstream transmission schedules and, in some embodiments, assigns upstream-transmission wavelengths.

Note that the components depicted in FIG. 3 are exemplary, and other configurations are possible. In some embodiments, additional components are also present, while in others, the function of more than one component shown in FIG. 3 may be combined in single component. In some embodiments, certain components of FIG. 3 may not be present at all.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the sequence in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

What is claimed is:

1. A method of mitigating latency in an optical access network, comprising:
   receiving a discovery response from a network node during a quiet window in upstream transmissions on a first upstream-transmission wavelength;
   assigning a secondary upstream-transmission wavelength for upstream transmissions to the network node, wherein the assigned secondary upstream-transmission wavelength is different than the first upstream-transmission wavelength; and
   scheduling upstream transmissions on the secondary upstream-transmission wavelength for at least the network node such that the quiet window for the upstream transmissions on the secondary upstream-transmission wavelength is smaller than the quiet window for the upstream transmissions on the first upstream transmission wavelength.

2. The method of claim 1, wherein scheduling the upstream transmissions on the secondary upstream-transmission wavelength includes scheduling no quiet window.

3. The method of claim 1, further comprising determining whether to schedule the upstream transmissions from the network node using the secondary upstream-transmission wavelength.

4. The method of claim 3, further comprising determining the service or services to be used by the network node and determining whether to schedule the upstream transmissions from the network node on the secondary upstream-transmission wavelength using at least the service or services to be used by the network node.

5. The method of claim 1, wherein the network node is an optical network unit (ONU) and wherein the optical access network is a passive optical network (PON).

6. The method of claim 1, further comprising determining whether the network node has data to transmit prior to scheduling the upstream transmissions from the network node.

7. The method of claim 6, further comprising determining how much data the network node has to transmit prior to scheduling the upstream transmissions from the network node.

8. The method of claim 1, further comprising distributing an upstream-transmission schedule to the network node.

9. The method of claim 1, wherein the optical access network comprises a plurality of network nodes and scheduling upstream transmissions comprises scheduling upstream transmissions for at least a portion of the plurality of network nodes.

10. The method of claim 9, wherein scheduling further comprises scheduling more than one of the plurality of network nodes to transmit upstream transmissions using the secondary upstream-transmission wavelength.

11. Apparatus for mitigating latency in an optical network, comprising:
    a processor and a memory, wherein the apparatus is configured by program instructions stored in the memory that when executed by the processor cause the apparatus to:
    receive a discovery response from a network node sent on a first upstream-transmission wavelength;
    assign a secondary upstream-transmission wavelength to the network node, wherein the assigned secondary upstream-transmission wavelength is different than the first upstream-transmission wavelength; and obtain a schedule for upstream transmissions such that the quiet window for upstream transmissions on the secondary upstream-transmission wavelength is smaller than upstream transmissions on the first upstream-transmission wavelength.

12. The apparatus of claim 11, wherein the schedule for upstream transmissions includes no quiet window for the upstream transmissions on the secondary upstream-transmission wavelength.

13. The apparatus of claim 11, wherein the apparatus is further configured to determine whether to schedule upstream transmissions from the network node using the secondary upstream-transmission wavelength.

14. The apparatus of claim 11, wherein the apparatus is further configured to determine the service or services to be used by the network node and wherein the service or services to be used by the network node is a factor in determining whether to schedule the upstream transmissions from the network node using the secondary upstream-transmission wavelength.

15. The apparatus of claim 11, wherein the apparatus is further configured to determine at least one optical access network traffic characteristic and wherein the at least one optical access network traffic characteristic is a factor in determining whether to schedule the upstream transmissions from the network node using the secondary upstream-transmission wavelength.

16. The apparatus of claim 11, wherein scheduling the upstream transmissions from the network node comprises scheduling all the upstream transmissions from the network node using the secondary upstream-transmission wavelength.

17. The apparatus of claim 11, wherein the apparatus is an optical line terminal (OLT) in a PON and the network node is an optical network unit (ONU) in the PON.

18. The apparatus of claim 11, wherein the network node is further configured to send a discovery message.

19. The method of claim 11, further comprising distributing an upstream-transmission schedule to the network node.

20. The apparatus of claim 11, wherein the optical network comprises a plurality of network nodes and wherein the apparatus is further configured to schedule upstream transmissions for at least a portion of the plurality of network nodes.

* * * * *